United States Patent
Kwon et al.

(10) Patent No.: US 7,639,321 B2
(45) Date of Patent: Dec. 29, 2009

(54) METHOD OF MANUFACTURING A COLOR FILTER SUBSTRATE WITH TRENCHES FOR A BLACK MATRIX

(75) Inventors: Oh Nam Kwon, Yongin-si (KR); Heung Lyul Cho, Suwon-si (KR); Seung Hee Nam, Suwon-si (KR)

(73) Assignee: LG. Display Co., Ltd., Seoul (KR)

( * ) Notice: Subject to any disclaimer, the term of this patent is extended or adjusted under 35 U.S.C. 154(b) by 272 days.

(21) Appl. No.: 11/208,487

(22) Filed: Aug. 19, 2005

(65) Prior Publication Data

US 2006/0274231 A1    Dec. 7, 2006

(30) Foreign Application Priority Data

Jun. 1, 2005    (KR) .................. 10-2005-0046723
Aug. 18, 2005   (KR) .................. 10-2005-0075823

(51) Int. Cl.
G02F 1/1335    (2006.01)
G02F 1/1333    (2006.01)

(52) U.S. Cl. ....................... 349/106; 349/110
(58) Field of Classification Search ............ 349/106, 349/109
See application file for complete search history.

(56) References Cited

U.S. PATENT DOCUMENTS

2002/0089615 A1*  7/2002  Sakamoto et al. ......... 349/43
2003/0062544 A1*  4/2003  Mochizuki ................. 257/200
2003/0147115 A1*  8/2003  Takizawa et al. .......... 359/263
2004/0131955 A1   7/2004  Yen

FOREIGN PATENT DOCUMENTS

JP  10206623       8/1998
KR  2003-0047862   6/2003

OTHER PUBLICATIONS

The Office Action dated Feb. 8, 2006 for corresponding German Application No. 10 2005 044 844.5-51.
Office Action dated Aug. 31, 2006 for corresponding Korean Patent Application No. 10-2005-0075823.
Office Action issued in corresponding German Patent Application No. 10 2005 044 844.5; issued Nov. 25, 2008.

* cited by examiner

*Primary Examiner*—David Nelms
*Assistant Examiner*—Jessica M Merlin
(74) *Attorney, Agent, or Firm*—Brinks Hofer Gilson & Lione

(57) ABSTRACT

A color filter substrate for an LCD device and a method for manufacturing the same, in which process steps are simplified and the manufacturing cost is reduced. The color filter substrate for an LCD device includes a substrate defined by a plurality of color filter regions and a black matrix region, R, G and B color filters respectively formed in the color filter regions of the substrate, a trench formed in the black matrix region of the substrate at a predetermined depth, and a black matrix formed inside the trench by overlapping the color filters.

2 Claims, 9 Drawing Sheets

FIG. 1
Related Art

Back light

METHOD OF MANUFACTURING A COLOR FILTER SUBSTRATE WITH TRENCHES FOR A BLACK MATRIX

This application claims the benefit of Korean Application Nos. P2005-46723 filed on Jun. 1, 2005 and 10-2005-0075823 filed on Aug. 18, 2005, both hereby incorporated by reference herein.

TECHNICAL FIELD

The present invention relates to a liquid crystal display (LCD) device and a method for manufacturing the same, and more particularly, to a color filter substrate for an LCD device and a method for manufacturing the same in which process steps are simplified and the manufacturing cost is reduced.

BACKGROUND

Generally, an LCD device displays a picture image by controlling light transmittance of a liquid crystal using an electric field.

To this end, the LCD device includes a liquid crystal panel arranged in a matrix arrangement and a driving circuit for driving the liquid crystal panel.

The liquid crystal panel is provided with pixel electrodes and a common electrode to apply the electric field to each of liquid crystal cells.

The pixel electrodes are formed on a lower substrate in a liquid crystal cell while the common electrode is formed on an entire surface of an upper substrate in a single body. Each of the pixel electrodes is connected with a thin film transistor (TFT) used as a switching device. The pixel electrodes are driven along with the common electrode in accordance with a data signal supplied through the TFT.

The LCD device can be fabricated to have a smaller size than that of a cathode ray tube, and is widely used for personal computers, notebook computers, office automation machines such as copiers, cellular phones, and pagers.

An active matrix type LCD device employs color filters of red (R), green (G), and blue (B) corresponding to the three primary colors of light to display a range of colors.

The respective color filters are arranged adjacent to one another and a corresponding color signal is applied to each color filter to control brightness, thereby displaying the colors.

The LCD device is fabricated using several processes with a substrate, including washing, substrate manufacture, substrate bonding/liquid crystal injection, and packaging. In the manufacturing process, the color filters are formed on the upper substrate.

Generally, a pigment dispersing method is most widely used to manufacture each color filter. In the pigment dispersing method, the color filter is manufactured by coating, exposure, development, and firing after dispersing pigment into a polyimide or acryl resin material of the color filter.

The pigment dispersing method has an advantage in that it is easy to form a fine pattern of the color filter. However, the pigment dispersing method has a drawback in that the manufacturing process of the color filter is complicated because a photolithographic process is required for each of the R, G, and B color filters.

Figure 1:
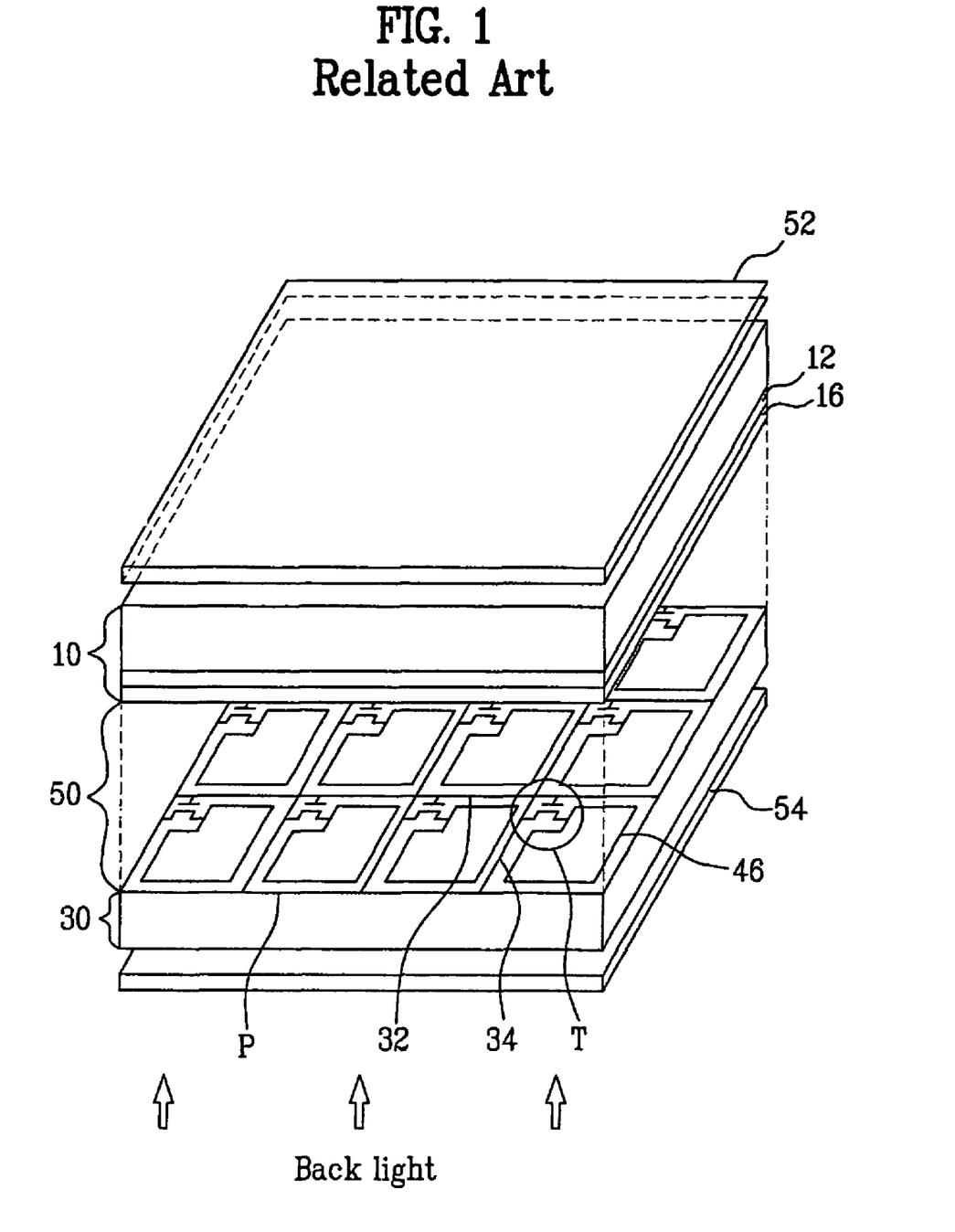
FIG. 1 is an elevational view illustrating some region of a general LCD device.

FIG. 1 is perspective assembly view illustrating a portion of a general LCD device.

As shown in FIG. 1, upper and lower substrates 10 and 30 oppose each other and they are separated from each other at a constant interval. A liquid crystal layer 50 is interposed between the substrates 10 and 30.

The lower substrate 30 is provided with a plurality of gate lines 32 and a plurality of data lines 34, wherein the gate lines 32 cross the data lines 34. A TFT (T) is formed at each crossing point where the gate lines 32 cross the data lines 34.

Further, a pixel region (P) is defined by the crossing point and provided with a pixel electrode 46 connected with the TFT.

Meanwhile, although not shown in detail, the TFT includes a gate electrode supplied with a gate voltage, source and drain electrodes supplied with a data voltage, and a channel that controls the On/Off state of the TFT using the difference between the gate voltage and the data voltage.

A color filter layer 12 and a common electrode 16 are sequentially formed on the upper substrate 10.

The color filter layer 12 includes a color filter that transmits light of a specific wavelength band only and a black matrix disposed at the boundary of the color filter to shield light on the pixel region P of the lower substrate 30.

Upper and lower polarizing plates 52 and 54 are respectively disposed on outer surfaces of the upper and lower substrates 10 and 30 to transmit light only parallel with a polarizing shaft. As a separate light source, a back light is arranged below the lower polarizing plate 54.

As described above, the aforementioned LCD device requires color filters of three primary colors of R, G and B to display full colors.

Hereinafter, a related art color filter substrate for an LCD device and a method for manufacturing the same will be described with reference to the accompanying drawings.

Figure 2A:
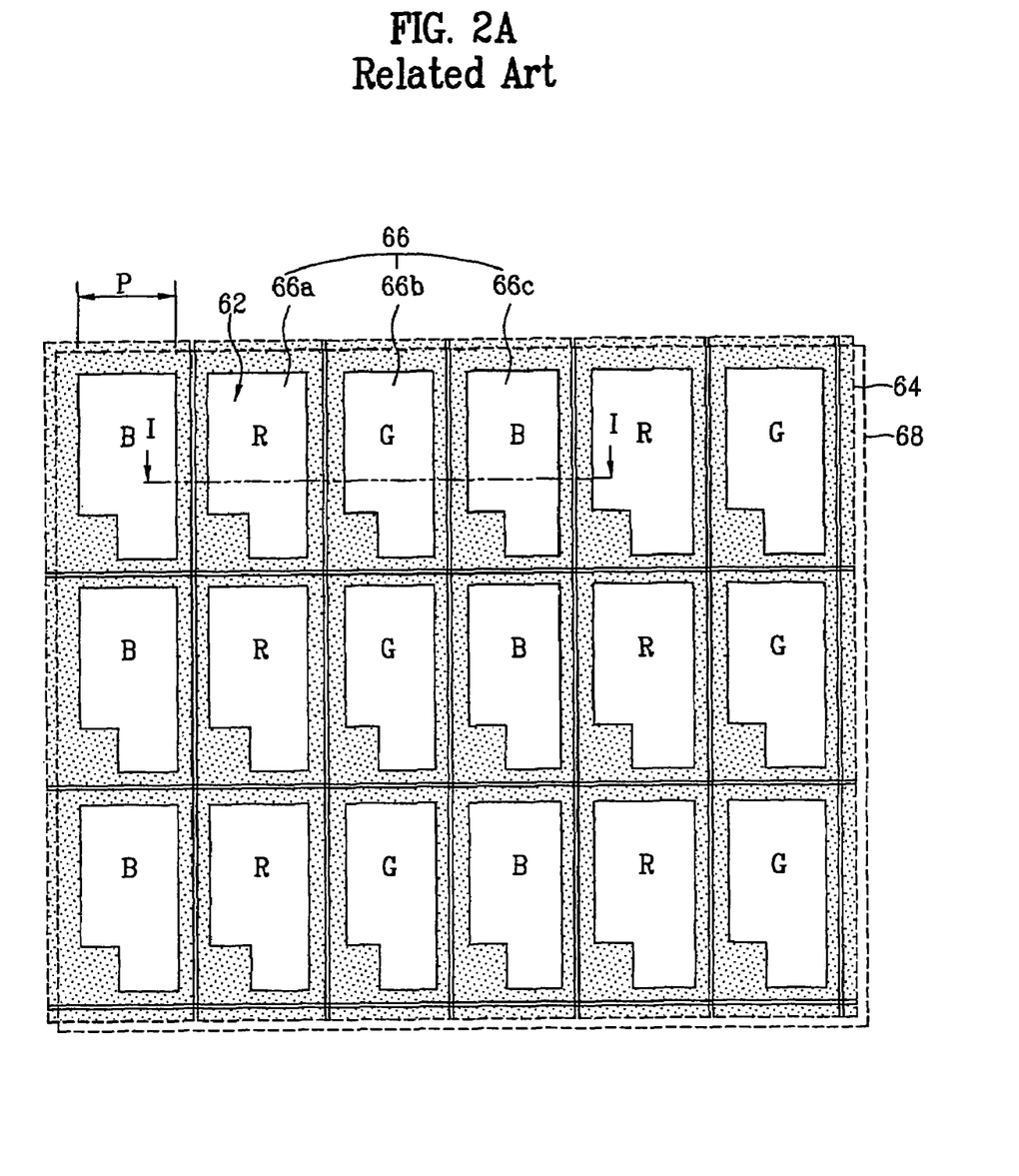
FIG. 2A is a plane view illustrating a related art color filter substrate for an LCD device.
Figure 2B:
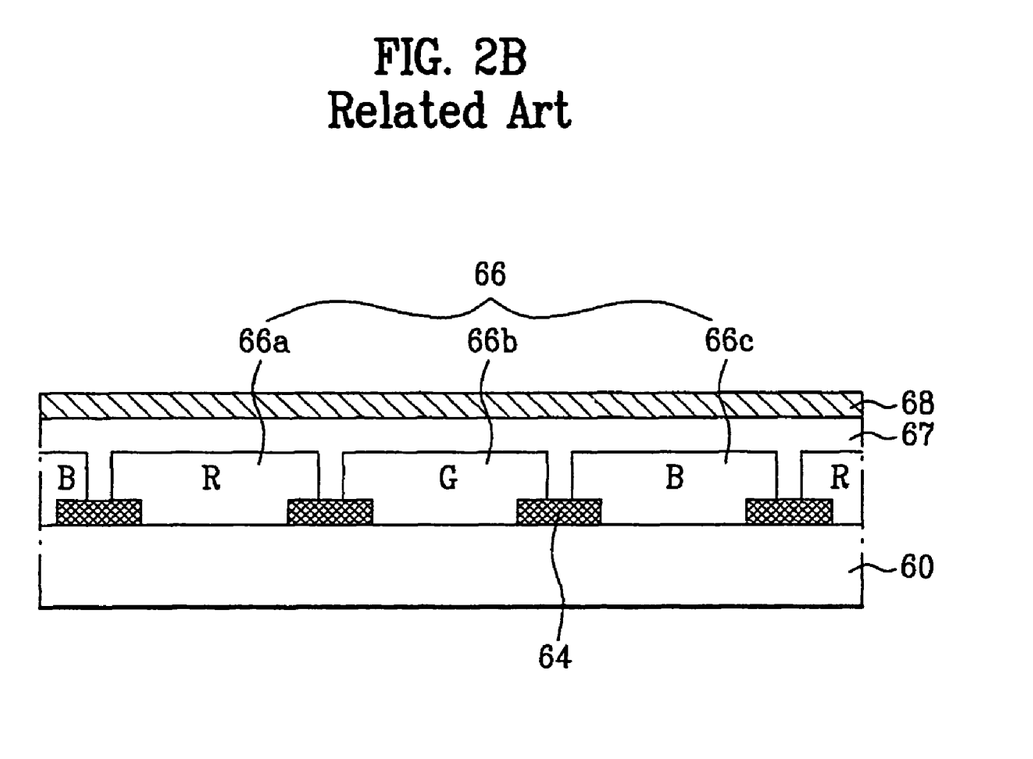
FIG. 2B is a sectional view taken along line I-I of FIG. 2A.

FIG. 2A is a plane view illustrating a related art color filter substrate for an LCD device and FIG. 2B is a sectional view taken along line I-I of FIG. 2A.

As shown in FIG. 2A, black matrices 64 and color filter layers 66 are formed. Each of the black matrices 64 surrounds a pixel region P and includes an opening 62. Each of the color filter layers 66 is provided with R, G and B color filters 66a, 66b and 66c that are repeatedly arranged in sequence using the black matrices 64 as the boundaries per color.

As shown in the cross-sectional view of FIG. 2B, subsequently, a common electrode 68 is formed on an entire surface of a substrate 60 including the color filter layers 66.

In other words, as shown in FIG. 2B, the black matrices 64 are formed on a glass substrate 60 and spaced apart from one another at constant intervals. The R, G and B color filters 66a, 66b and 66c are sequentially formed using the black matrices 64 as the boundaries for the color filter layers 66. An overcoat layer 67 and the common electrode 68 are sequentially formed on the entire surface of the substrate 60 including the color filter layers 66.

FIG. 3A to FIG. 3F are sectional views illustrating a related art method for manufacturing a color filter substrate for an LCD device.

Figure 3A:
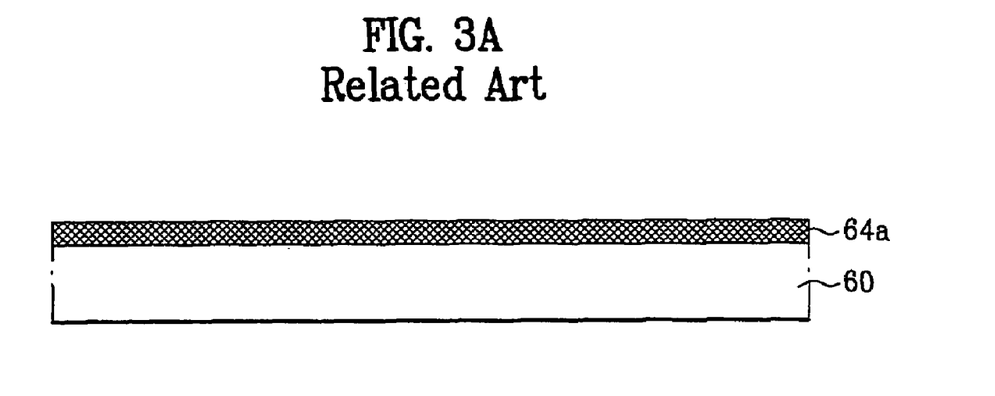
FIG. 3A to FIG. 3F are sectional views illustrating a related art method for manufacturing a color filter substrate for an LCD device.

As shown in FIG. 3A, a resin material 64a of consisting of a metal thin film, such as chrome, or carbon is deposited on the glass substrate 60 by sputtering.

Figure 3B:
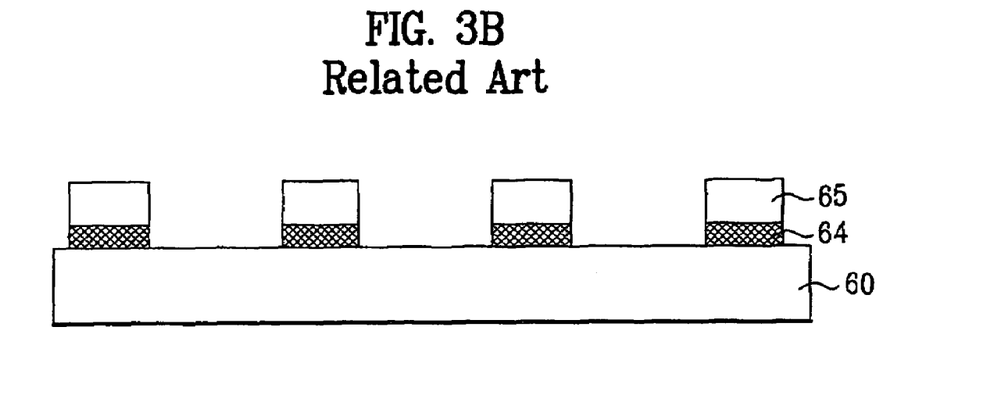

As shown in FIG. 3B, a photoresist 65 is deposited on the resin material 64a and then patterned by exposing and developing processes to define a black matrix region.

Subsequently, the resin material 64a is selectively patterned using the patterned photoresist 65 as a mask to form the black matrices 64 at constant intervals.

The black matrices 64 are formed to correspond to a corner of a unit pixel and a region where the TFT is formed, and they shield a region having unstable electric field.

Figure 3C:
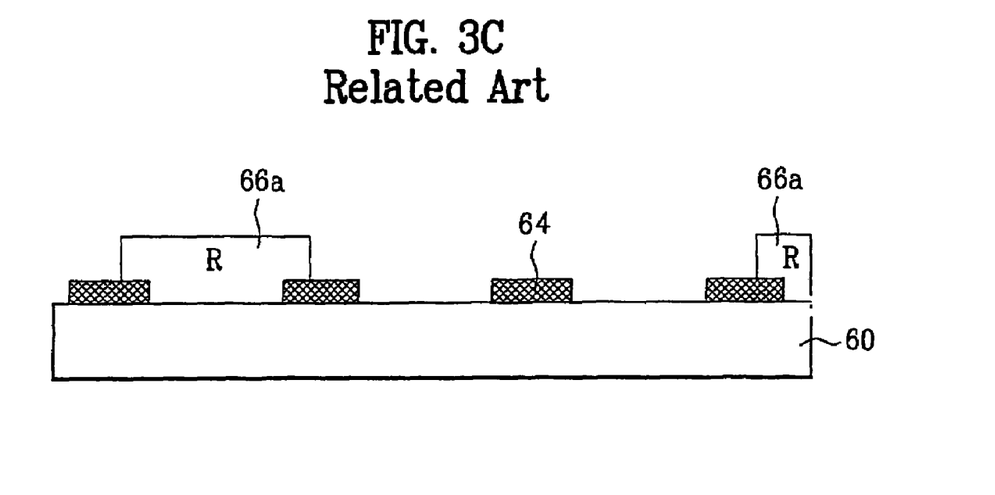

In FIG. 3C, an R color resist is deposited on the entire surface of the glass substrate 60 including the black matrices 64. Then, the R color resist is selectively patterned by a photolithographic process to form the R color filter 66a where both ends overlap on the black matrices 64.

Figure 3D:
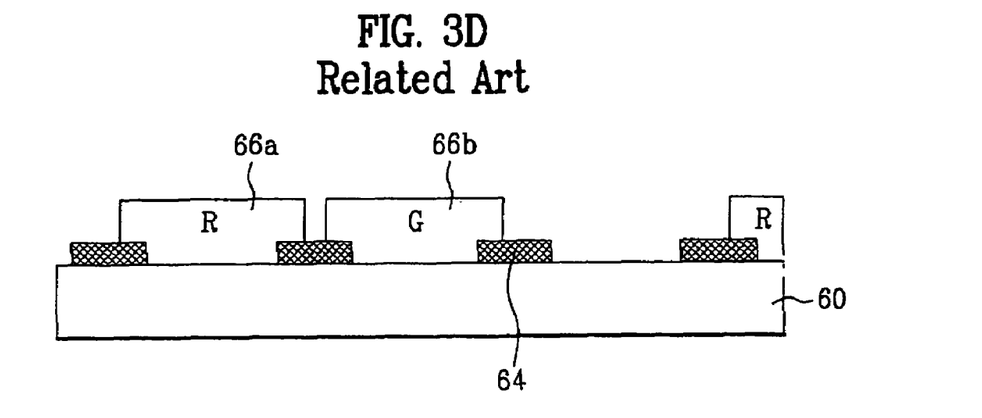

In FIG. 3D, a G color resist is deposited on the entire surface of the glass substrate 60 including the R color filter 66a. Subsequently, the G color resist is selectively patterned by the photolithographic process to form the G color filter 66b.

The G color filter 66b is formed in a pixel adjacent to the R color filter 66a with the black matrix 64 therebetween.

Figure 3E:
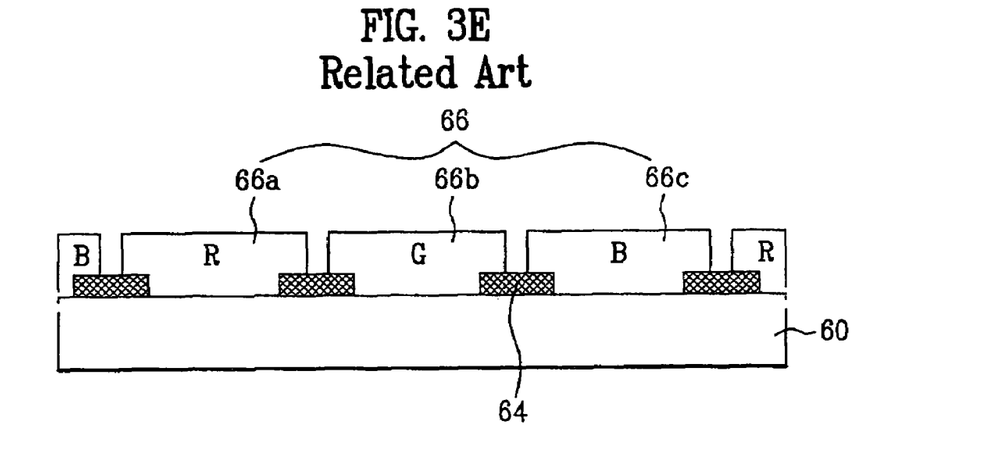

In FIG. 3E, a B color resist is deposited on the entire surface of the glass substrate 60 including the G color filter 66b. Then, the B color resist is selectively patterned by the photolithographic process to form the B color filter 66c.

The B color filter 66c is formed in a pixel adjacent to the G color filter 66b with the black matrix 64 therebetween. Thus, the color filter layers 66 of R, G and B are completed.

The color filter layers 66 are generally formed in the order of R, G and B.

Figure 3F:
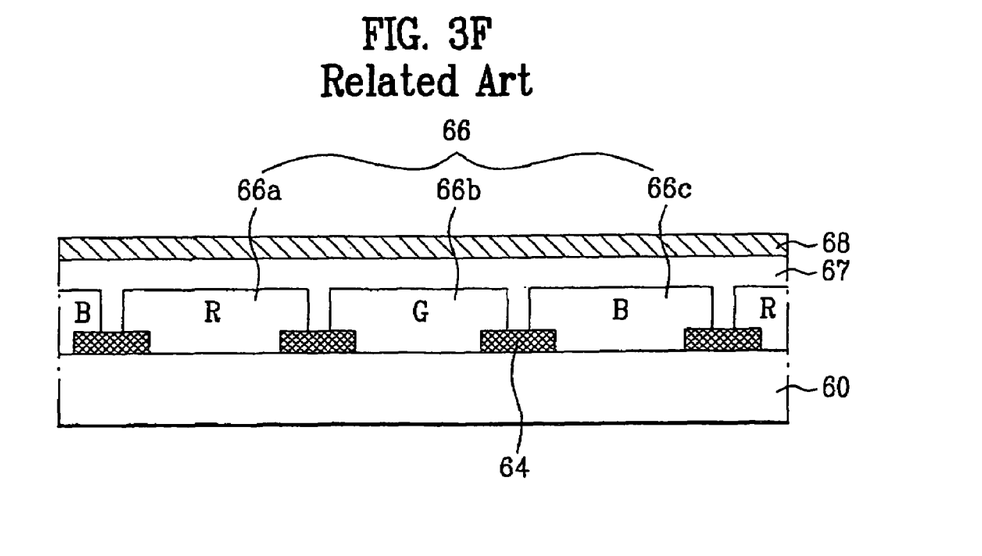

As shown in FIG. 3F, to protect and planarize the color filter layers 66, a planarization film is deposited on the entire surface of the glass substrate 60 including the color filter layers 66 by spin coating an acryl based resin or polyimide based resin, thereby forming the overcoat layer 67.

Subsequently, indium tin oxide (ITO) is deposited on the overcoat layer 67 by sputtering to form the common electrode 68. The ITO has good transmittivity, good conductivity and excellent thermal stability, and is a preferred material for a transparent electrode.

The common electrode 68 serves to drive the liquid crystal cell along with a pixel electrode formed on a TFT array substrate.

In accordance with the prior art process described above, the color filter substrate including the black matrices 64, the color filter layers 66, the overcoat layer 67, and the common electrode 68 is completed.

For reference, in an in-plane switching (IPS) mode LCD device, since the common electrode is formed on the TFT array substrate, the color filter substrate supports the black matrices, the color filter layers, and the overcoat layer.

However, the aforementioned related art color filter substrate for the LCD and the method for manufacturing the same have several problems.

First, since the black matrices are formed at the boundary of each color filter using either metal such as Cr or black resin, the black matrix manufacturing cost is high. Second, since the overcoat layer is separately formed to planarize the color filters having an uneven step difference due to the intervening black matrices, the process is complicated and the process time becomes long. Finally, if each color filter is formed to overlap the black matrices, it is difficult to obtain satisfactory planarization and optical density.

BRIEF SUMMARY

Accordingly, the present invention is directed to a color filter substrate for an LCD device and a method for manufacturing the same, which substantially obviate one or more problems due to limitations and disadvantages of the related art.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the invention, as embodied and broadly described herein, a color filter substrate for an LCD device includes a substrate having a plurality of color filter regions and a black matrix region, red, green and blue color filters in the respective color filter regions of the substrate, a trench in the black matrix region of the substrate having a predetermined depth, and a black matrix inside the trench and comprising overlapping the red, green, and blue color filters.

In another aspect of the present invention, a method for manufacturing a color filter substrate for an LCD device includes the steps of preparing a substrate having a plurality of color filter regions and a black matrix region, forming a trench in the black matrix region of the substrate at a predetermined depth, forming red, green and blue color filters respectively in the color filter regions of the substrate, and sequentially overlapping a portion of the red, green and blue color filters to form a black matrix inside the trench.

In yet another aspect a method of forming a black matrix in substrate for an LCD device includes the steps of providing a substrate and forming a trench in the substrate, and forming overlying red, green, and blue color resists either in the trench or in an area defined by the trench.

In still another aspect, a color filter substrate for an LCD device includes a substrate having a plurality of color filter regions, red, green and blue color filters in the respective color filter regions of the substrate, a trench defining a black matrix region on the substrate, wherein a black matrix material in the black matrix region comprises overlying portions of the red, green, and blue color filters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
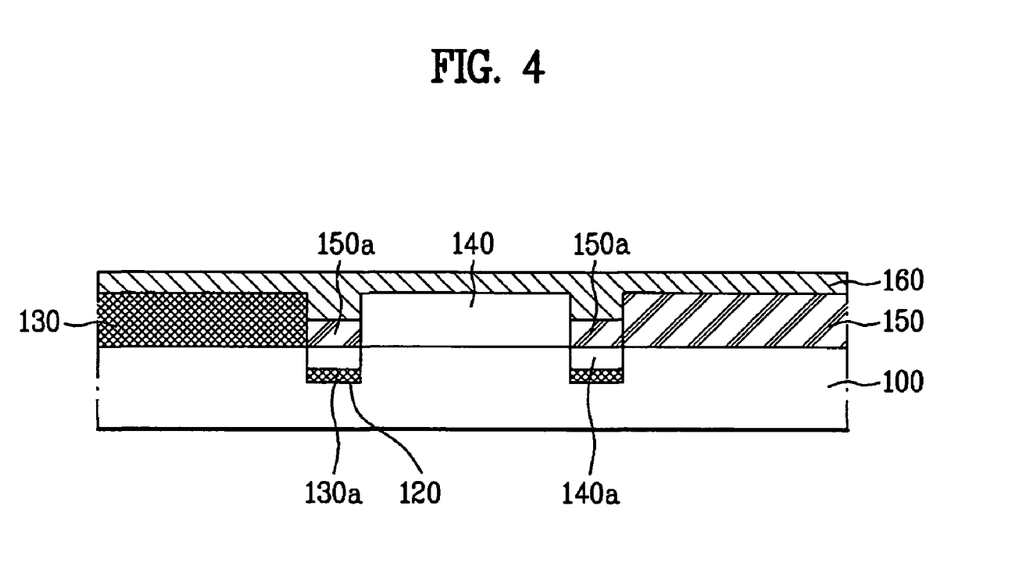
FIG. 4 is a sectional view illustrating a color filter substrate for an LCD device according with an embodiment of the present invention.

FIG. 4 is a sectional view illustrating a color filter substrate for an LCD device according to an embodiment of the present invention.

As shown in FIG. 4, the color filter substrate for an LCD device according to the present invention includes a transparent substrate 100 having a plurality of color filter regions and a black matrix region. R, G and B color filters 130, 140 and 150, respectively, are formed in each color filter region of the substrate 100. Trenches 120 are formed in the black matrix region of the substrate 100 at a predetermined depth. A black matrix is formed inside the trench 120 at the same material as that of the color filters 130, 140 and 150, and a common electrode 160 is formed on the color filters 130, 140 and 150 and the black matrix.

In the black matrix, respective portions of color resists 130a, 140a, and 150a of the R color filter 130, the G color filter 140 and the B color filter 150 remain in the trench 120 in a sequentially deposited pattern.

Also, the black matrix and the color filters 130, 140 and 150 are formed at the same height as one another.

FIG. 5A to FIG. 5H are sectional views illustrating a method for manufacturing the color filter substrate for the LCD device according to an embodiment of the present invention.

Figure 5A:
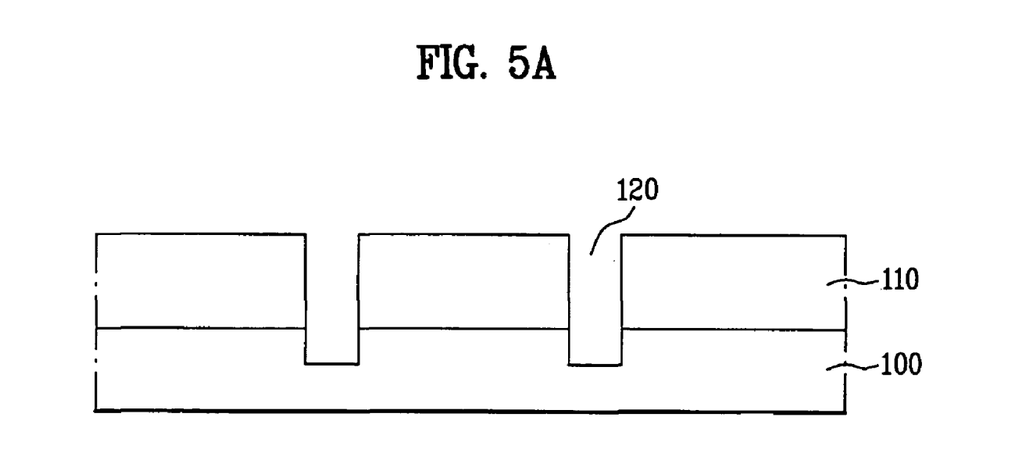
FIG. 5A to FIG. 5H are sectional views illustrating a method for manufacturing a color filter substrate for an LCD device in accordance with an embodiment of the present invention.

As shown in FIG. 5A, a photoresist layer 110 is deposited on the transparent substrate 100 and then selectively patterned by an exposure and development process to define the black matrix region.

Other regions of the substrate 100 except for the black matrix region are configured for the color filters and correspond to a pixel region of a lower substrate.

Subsequently, the exposed substrate 100 is selectively etched using the patterned photoresist 110 layer as a mask to form the trench 120 having a predetermined depth.

The trench 120 preferably has a depth of about 10 microns (μm) or lessand, more preferably, about 5 μm to about 10 μm. Preferably, an etching gas containing HF is used for etching the substrate 100.

Figure 5B:
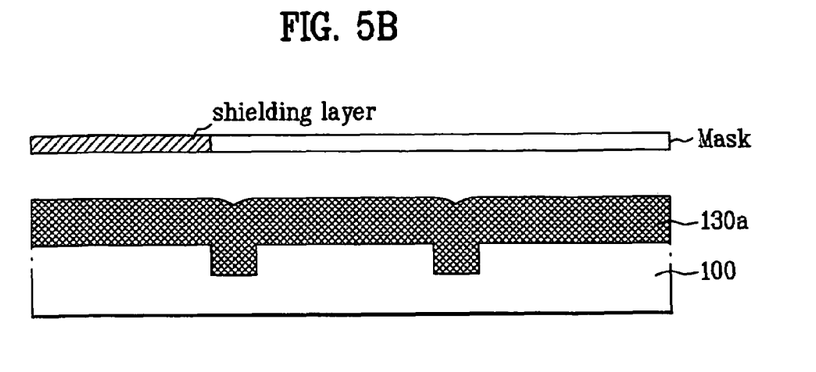

As shown in FIG. 5B, the photoresist 110 is removed, and the R color resist 130a is deposited on the entire surface of the substrate 100 including the trench 120.

The R color resist 130a can be formed by a spinning method or a spinless coating method.

In the spinning method, a color resist is deposited on the substrate and the substrate is rotated at high speed to uniformly disperse the color resist over the substrate. In the spinless coating method, the color resist on a roll is transferred/printed onto the substrate.

Further, in similarity with a general photoresist, the R color resist 130a contains a photo-polymerization initiator, a monomer, a binder, and an organic pigment for displaying color.

When the R color filter 130a is deposited on the entire surface of the substrate 100, the color resist over the trench 120 has a greater thickness than the other portions due to its planarization characteristic.

Figure 5C:
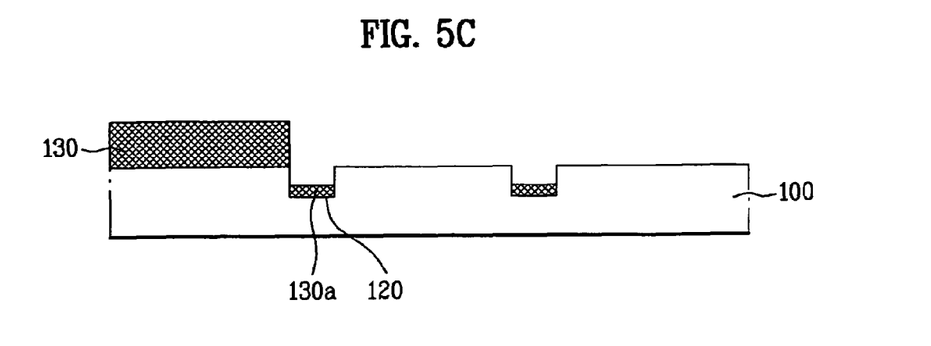

As shown in FIG. 5C, after a specific region of the R color resist 130a is masked by a light-shielding portion of a mask, the R color resist 130a is exposed by irradiating UV rays.

At least one of three methods for exposing the color resist can be used, such as a proximity method that exposes an original plate by sunlight, a stepper method that performs exposure by repeating a reduced pattern, and a mirror projecting method that performs exposure by projecting a mask pattern.

For a simple matrix LCD based on low cost fabrication, the proximity method can be used having high processing speed, while the fabrication of an active matrix LCD that requires high accuracy requires the use of the stepper method or the mirror projecting method.

The irradiated R color resist 130a, of which the photochemical structure has been changed by exposure, is hardened at high temperature of 230° C. and developed to form the R color filter 130. Next, the R color resist 130a is developed using a developing method such as dipping, puddle, and shower spray.

For reference, if the R color resist 130a has negative resist characteristic, a non-exposed portion is removed. In this case, the specific region for the pattern is exposed to the light-transmitting portion of the mask unlike the aforementioned case.

Meanwhile, if the R color resist 130a is developed to form the R color filter 130, the color resist overlying the trench 120 has a greater thickness than the other portions due to its planarization characteristic as described above. Therefore, as shown in FIG. 5C, a portion of the R color resist 130a remains at a predetermined thickness without being completely removed and serves as the black matrix.

Figure 5D:
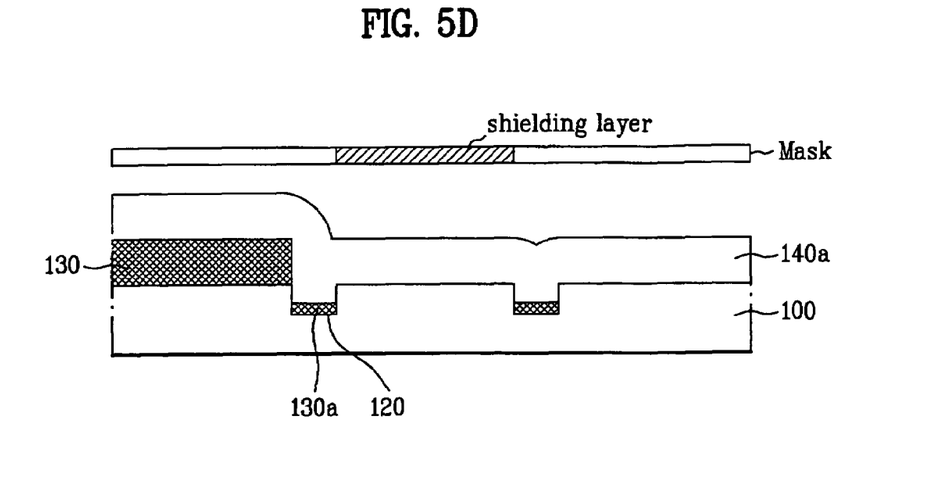

As shown in FIG. 5D, the G color resist 140a is deposited on the entire surface of the substrate 100 including the R color filter 130a, and a specific region of the G color resist 140a is masked by a light-shielding layer of a mask.

Figure 5E:
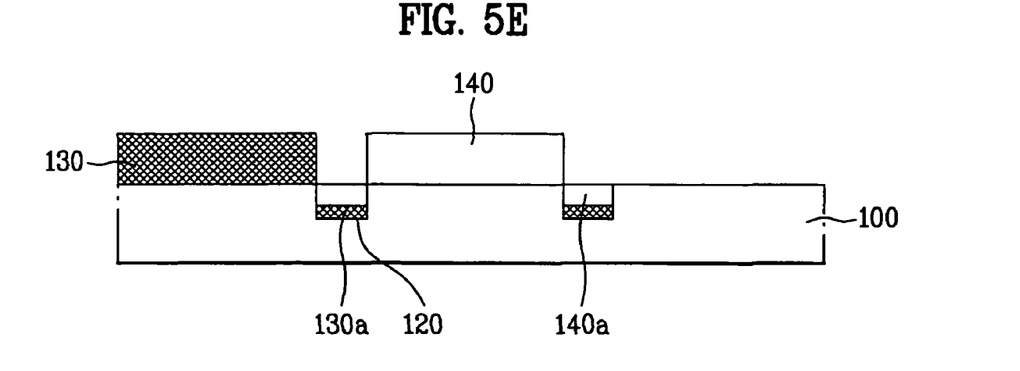

In FIG. 5E, the masked G color resist 140a is exposed by UV irradiation and developed to form the G color filter 140. The G color filter 140 is formed in a pixel adjacent to the R color filter 130 with the trench 120 therebetween.

As the G color resist 140a is developed to form the G color filter 140, the color resist inside the trench 120 has a greater thickness than the other portions due to its planarization characteristic as described above. Therefore, a portion of the G color resist 140a remains in trench 120 at a predetermined thickness without being completely removed.

Figure 5F:
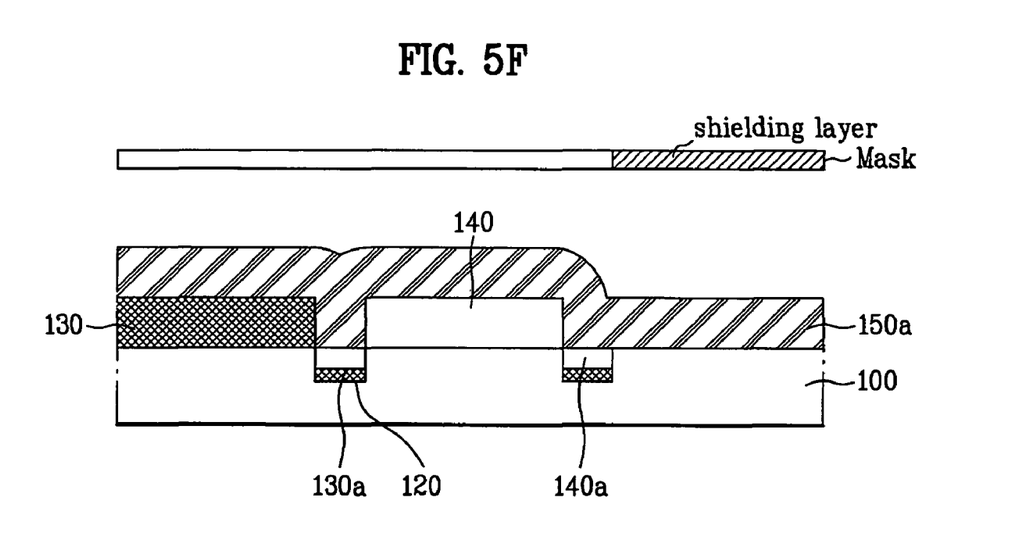

In FIG. 5F, the B color resist 150a is deposited on the entire surface of the substrate 100 including the G color filter 140, and a specific region of the B color resist 150a is masked by the light-shielding portion of the mask. Then, the masked B color resist 150a is exposed by UV irradiation.

Figure 5G:
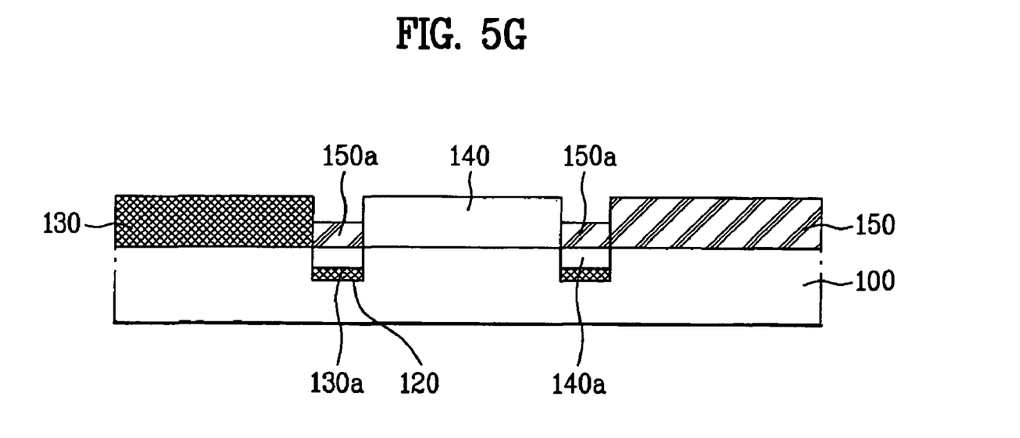

Subsequently, as illustrated in FIG. 5G, the B color resist 150a, of which photo-chemical structure has been changed by exposure, is developed to form the B color filter 150. The B color filter 150 is formed in a pixel adjacent to the G color filter 140 with the trench 120 therebetween. Accordingly, the color filter layers of R, G and B are fabricated by the process described above.

When the B color resist 150a is developed to form the B color filter 150, the color resist over the trench 120 has a greater thickness than the other portions due to its planarization characteristic as described above. Therefore, a portion of the B color resist 150a remains at a predetermined thickness without being completely removed and, in combination with color resist portions 130a and 140a serves as the black matrix.

Consequently, respective overlapping color resists 130a, 140a, and 150a remain overlying the trenches 120 in a pattern generally corresponding to the trenches 120 and function as the black matrix.

Figure 5H:
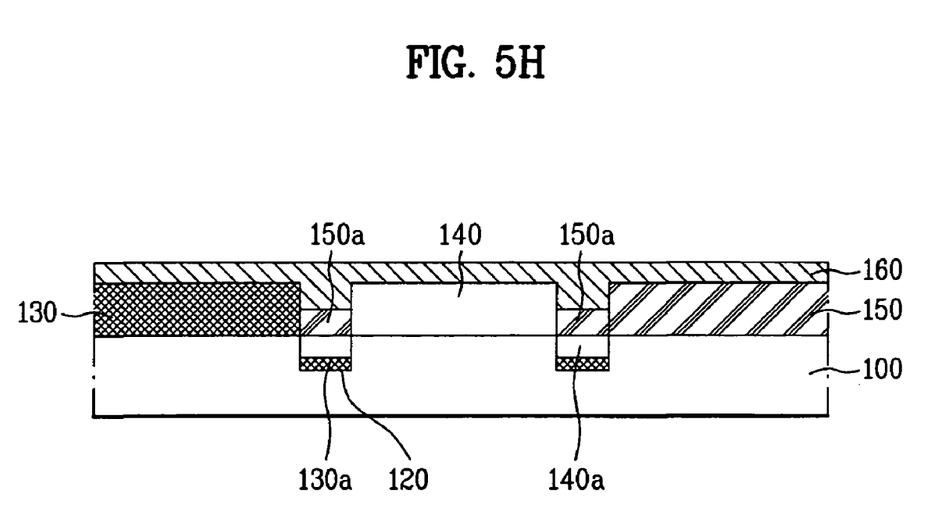

As shown in FIG. 5H, in one embodiment of the invention, a layer 160 is deposited on the respective color filters 130, 140 and 150. In one embodiment of the invention, layer 160 is an ITO layer formed by sputtering and forms a common electrode 160. The ITO has good transmittivity, good conductivity and excellent thermal stability, and is a preferred material for the transparent electrode.

The common electrode 160 serves to drive the liquid crystal cells along with a pixel electrode formed on a TFT array substrate.

Figure 6:
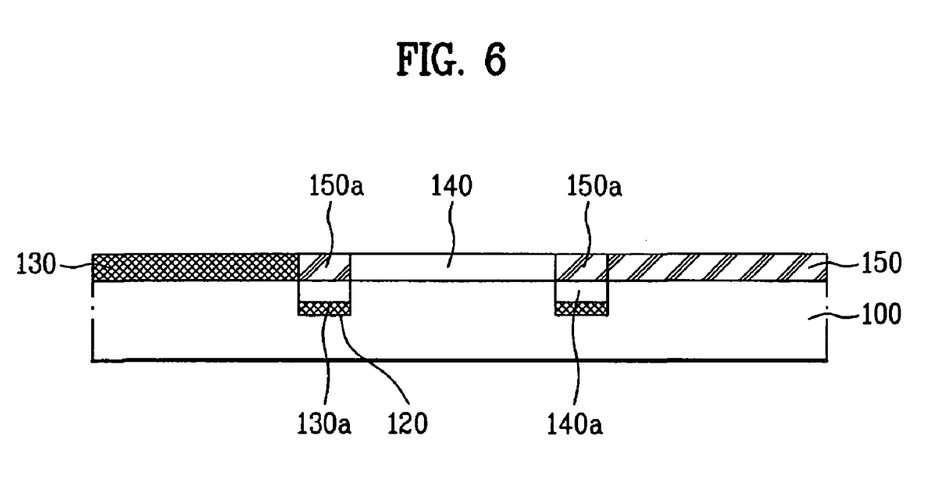
FIG. 6 is a sectional view showing the color filter substrate after a planarization process.

It is important to note that although layer 160 has been described as an ITO layer that forms a common electrode, layer 160 can simply be an overcoat layer. For example, in an in-plane-switching (IPS) mode LCD device, since the common electrode is formed on the TFT array substrate, the color filter substrate is completed by forming the color filter layers. Accordingly, where the inventive process is carried out to form an IPS mode LCD device, layer 160 represents an overcoat layer instead of a common electrode.

Where layer 160 is an overcoat layer, a planarization process is carried out either before or after forming the overcoat layer to form a smooth, relatively flat surface. As shown in FIG. 6, the planaraization process creates a continuous upper surface across the color filters and the black matrix. Preferably, the planarization process is performed by a chemical mechanical polishing (CMP) process. The CMP process removes all surface materials at substantially the same rate to form an upper surface having a consistent height above substrate 100.

As described above, the color filter substrate for the LCD device and the method for manufacturing the same according to the present invention have the following advantages.

First, since the black matrix is formed by overlapping the respective color filters after forming the trench in the black matrix region by selectively etching the substrate, no separate black matrix material is required, thereby reducing the manufacturing cost.

Second, since no step difference is formed between each color filter and the black matrix, the overcoat layer for planarization can be omitted. This can simplify the process steps and reduce the manufacturing cost.

Third, since the black matrix is formed in the trench by overlapping the respective color filters, it is possible to obtain uniform overlap thickness and optical density.

Finally, since no resin black matrix is used, it is possible to reduce the manufacturing cost and a defect that may be caused by projection of the black matrix.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a color filter substrate for an LCD device comprising the steps of:
   preparing a substrate having a plurality of color filter regions and a black matrix region;
   selectively etching the black matrix region of the substrate using an etching gas containing HF to form a trench in the black matrix region of the substrate at substantially a 10 μm depth;
   forming red, green and blue color filters respectively in the color filter regions of the substrate and sequentially overlapping a portion of the red, green and blue color filters to form a black matrix overlying the trench, wherein the step of forming the red, green and blue color filters comprises depositing a red color resist on the entire surface of the substrate including the trench and selectively patterning the red color resist; hardening only the red color resist at a high temperature of 230° C.; depositing a green color resist on the entire surface of the substrate including the red color resist in the trench and selectively patterning the green color resist; depositing a blue color resist on the entire surface of the substrate including the green color resist in the trench and selectively patterning the blue color resist;
   wherein forming the trench and selectively patterning the overlapping portion of the red, green and blue color filters in the trench defines the black matrix on the substrate;
   performing a chemical mechanical polishing process to form a continuous upper surface across the color filters in the color filter regions and the black matrix, wherein each of the red, green and blue color filters in the color filter regions has the same height as that of the black matrix;
   forming a common electrode overlying the substrate and the red, green and blue color filters and the black matrix;

2. A method of forming a black matrix in substrate for an LCD device comprising the steps of:
   providing a substrate and forming a trench in the substrate at 5 microns depth; and forming stacked red, green, and blue color resists overlying the trench, wherein forming stacked red, green, and blue color resists comprises:
   forming a first of the red, green, or blue color resist on the substrate and filling the trench and patterning the first color resist to define a first color filter on the substrate while leaving a first portion of the first color resist in the trench; forming a second of the red, green, or blue color resist on the substrate and patterning the second color resist to define a second color filter on the substrate while leaving a second portion of the second color resist overlying the first portion of the first color resist; and forming a third of the red, green, or blue color resist on the substrate and patterning the third color resist to define a third color filter on the substrate while leaving a third portion of the third color resist overlying the second portion of the second color resist;
   wherein forming stacked red, green, and blue color resists comprises hardening only the red color resist on the substrate at a high temperature of 230° C.;
   wherein forming stacked red, green, and blue color resists overlying the trench comprises forming red, green, and blue color filters on the substrate, and wherein a portion of each color filter is formed in one of the trench or in an area defined by the trench;
   performing a chemical mechanical polishing process to form a continuous upper surface across the color filters on the substrate and the portion of each color filter formed in one of the trench or in an area defined by the trench, wherein each of the red, green and blue color filters on the substrate has the same height as the portion of each color filter formed in one of the trench or in an area defined by the trench;
   forming an overcoat layer on each of the red, green and blue color filters and the black matrix.

* * * * *